Patented Oct. 6, 1931

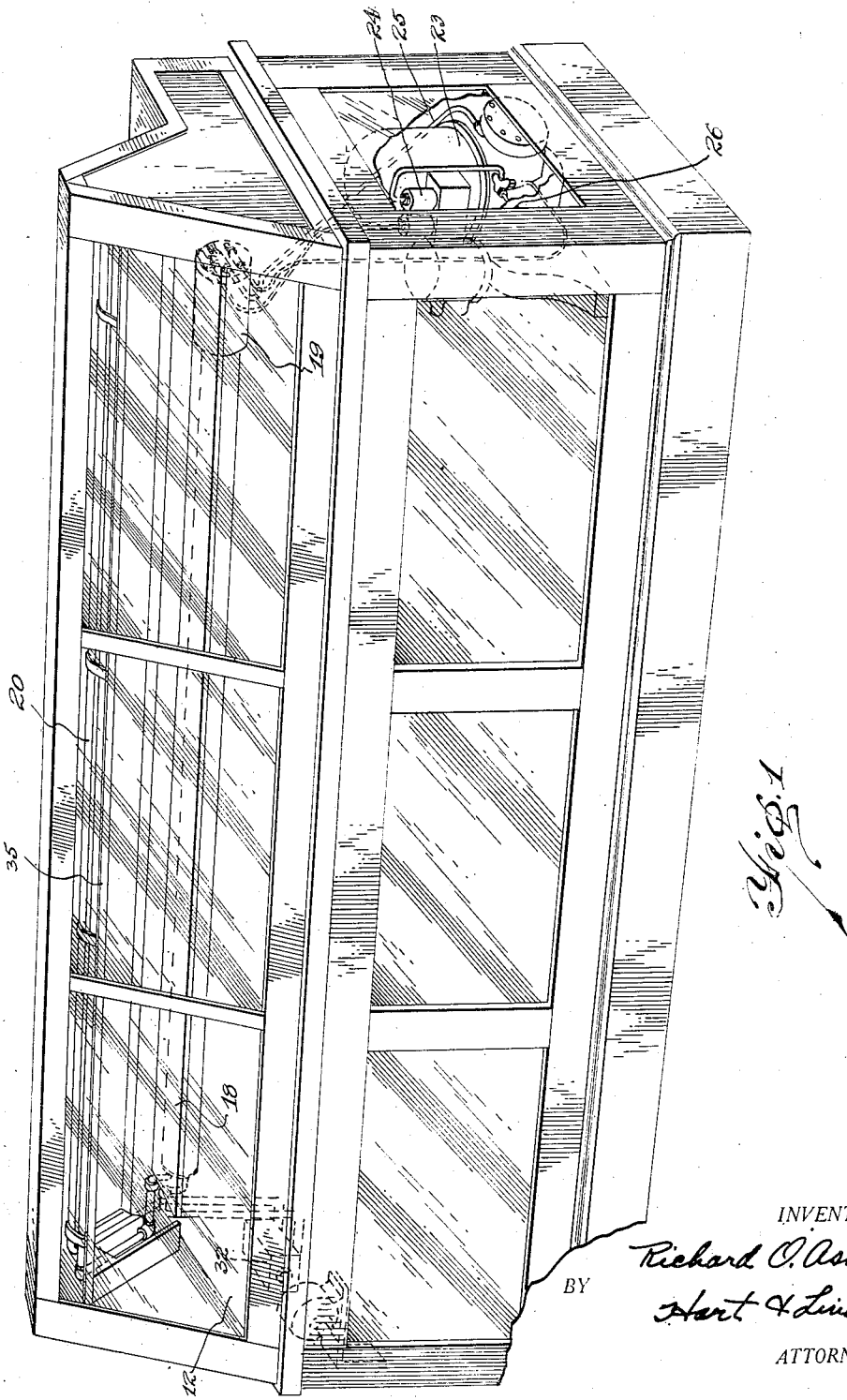

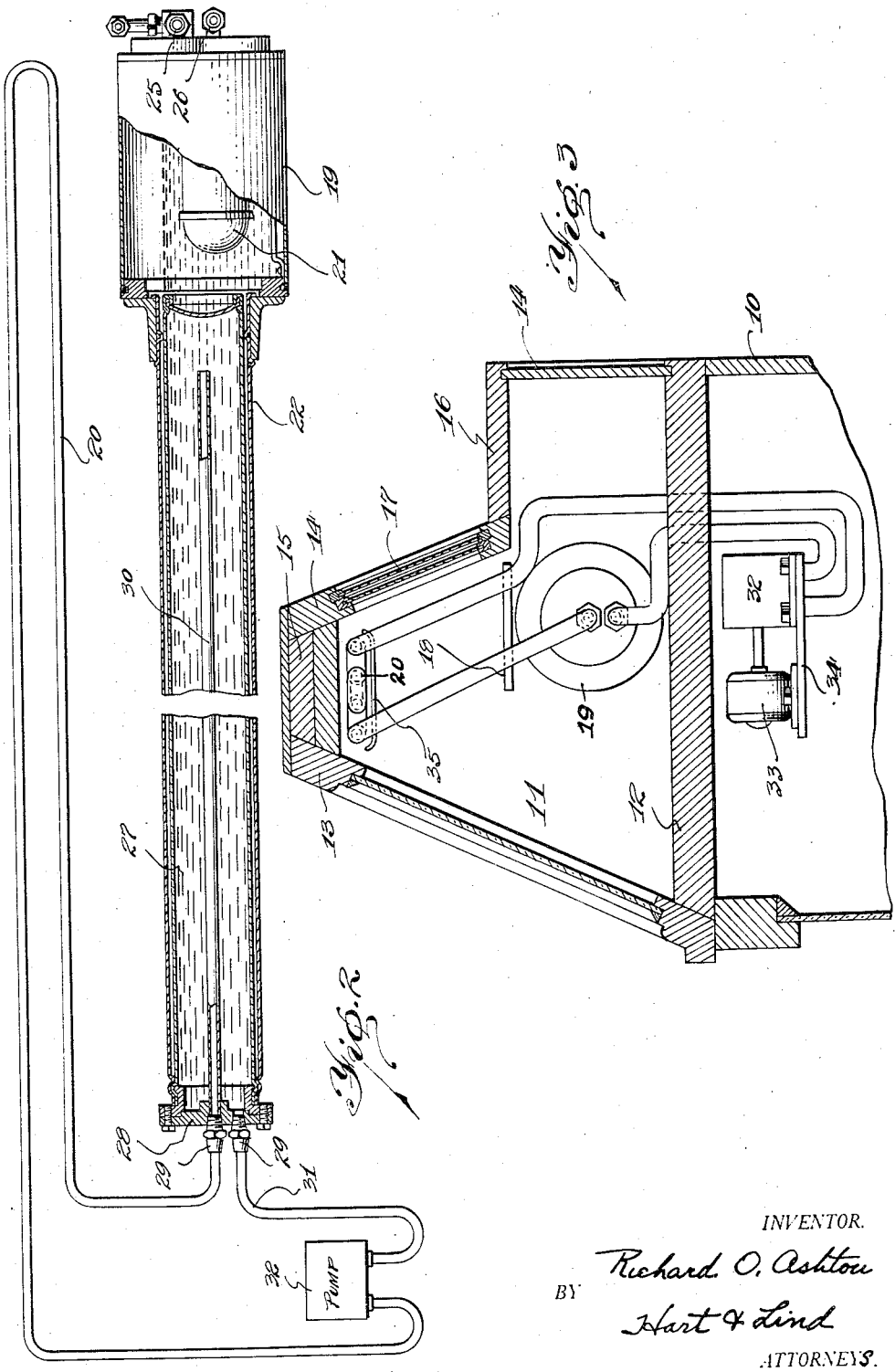

1,826,339

UNITED STATES PATENT OFFICE

RICHARD O. ASHTON, OF DETROIT, MICHIGAN, ASSIGNOR TO KELVINATOR CORPORATION, OF DETROIT, MICHIGAN, A CORPORATION OF MICHIGAN

MECHANICAL REFRIGERATING APPARATUS

Application filed July 18, 1927. Serial No. 206,469.

This invention relates to mechanical refrigerating apparatus, and more particularly to a dual system for refrigerating chambers which are frequently subjected to external warm air.

An object of my invention is to provide a mechanical refrigerating system which will maintain, at a low operating cost, a relatively low temperature in a chamber frequently exposed to higher external temperatures.

Another object of my invention is to provide a mechanical refrigerating apparatus for meat counters and the like, in which a relatively long area is to be maintained at a low temperature, which can be assembled to absorb heat from the upper and bottom portions of the chamber without materially reducing the storage space within the chamber.

Still another object of my invention is to provide mechanical refrigerating apparatus of a character which will not interfere with the examination of food stored in a chamber, and which will absorb heat from both the top and bottom portions of the chamber.

A further object of my invention resides in a mechanical refrigerating apparatus in which a circulating brine system extends interiorly of an evaporator associated with refrigerant compressing and condensing means to provide efficient dual heat absorbing means.

Other objects of the invention, more or less incidental or ancillary to the foregoing, will appear in the following description which sets forth in connection with the accompanying drawings a preferred embodiment of the invention.

In the accompanying drawings,

Fig. 1 illustrates a perspective view of a counter having my invention associated therewith.

Fig. 2 illustrates an elevational view, partially diagrammatic and partially in section, of the mechanical refrigerating apparatus removed from the counter.

Fig. 3 is an end view of the counter having the refrigerating apparatus installed therein, the end of the counter being broken away to more clearly illustrate the refrigerating mechanism.

Referring now more particularly to the drawings by characters of reference, 10 represents a base upon which a refrigerated meat counter 11 is mounted, the base providing an unrefrigerated storage chamber. The refrigerated counter is preferably formed with a bottom wall 12, front wall 13, a rear wall 14, a top wall 15 and a shelf extension portion 16. The front wall 13 is formed partially of glass, and the rear wall 14 is provided with slidable doors 17, preferably glass doors, through which meat and other food to be placed on display and refrigerated internally of the counter can be inserted and removed. A shelf 18 extends horizontally across the rear and central portion interiorly of the counter chamber. The counter structure not described is of conventional form and is illustrated for the purpose of showing the application of my invention which I will now describe.

It is assembled, in order to maintain a low temperature within a meat counter and similar chambers which are frequently exposed to warm external air by the opening of doors, with heat transferring means to be provided at the upper and lower portions of the chamber. In order to secure this form of desired refrigerating mechanism, I provide an evaporator 19 arranged adjacent the base 12 and beneath the shelf 18, with which is associated a circuitous brine circulating system 20 which extends in its major part in a plane adjacent the top wall of the counter chamber 11. The evaporator 19 is preferably of the flooded type in which a substantially constant quantity of liquid refrigerant, such as sulphur dioxide, is maintained by a valve controlled by a float 21. That portion of the evaporator 19 which houses the float is of larger diameter than the evaporator extension portion 22 and this difference in diameters is caused by the larger space necessary to accommodate the float 21. The evaporator sections are preferably annular in cross section and of a length sufficient to extend substantially the entire length of the meat counter chamber.

The vaporizer 19 is connected in circuit with a refrigerant condenser and compressor structure 23 of a conventional type, and reference may be had to Patent No. 1,476,546 issued December 4, 1923, in which is contained a specific illustration and description of such mechanism. Suitable controls 24 are associated with the system to automticly start and stop the compressor at predetermined temperatures existing within the system. The compressor, condenser and control structures are preferably housed within one end of the supporting base 10 and a refrigerant return line 25 extends from the compressor to the evaporator, and a refrigerant feed line 26 extends from the condenser to the evaporator. The refrigerant travels in a closed circuit of which the evaporator is a portion and is expanded within the evaporator, compressed within the compressor, and condensed within the condenser, in which condition it is admitted into the evaporator.

The brine circulating system 20 associated with the evaporator, consists of a circuitous conduit which is coiled in a horizontal plane at the top of the meat counter cooler, the ends of which extend into a closed brine container 27. The brine container is preferably formed as a cylindrical shell which is telescopically arranged within the evaporator extension section 22 and in spaced relation therewith. The brine container 27 is provided with a removable end wall 28 through which the open ends of the brine circulating conduit communicate with the interior of the container, suitable couplings 29 being provided to secure the ends of the conduit to the openings in the end wall of the container. A pipe 30 is associated with the return end of the conduit so that brine passing into the container 27 will be admitted at the end thereof adjacent the end nearest the float 21 thereby causing the warm brine to enter adjacent one end of the container and travel substantially the full length of the container before passing out into the feed end 31 of the conduit. The advantage of admitting the brine in this manner through the pipe 30 obviously assists in the efficiency of the heat transfer from the brine to the refrigerant within the vaporizer, which substantially surrounds the container 27. A pump 32 operated by a suitable motor 33 or by other mechanical means, is interposed within the brine conduit and provides mechanical means for causing a circulation of the brine through the circuitous brine circulating conduit of which the container 27 forms a part. The pump and motor are preferably mounted on a shelf 34 arranged within the supporting base of the meat counter and preferably at the end thereof removed from the compressor-condenser unit heretofore described. The brine conduit extends through the base 12 of the counter where it is connected in a circuit with the pump 32.

A condensation receiving pan 35 is arranged beneath the coiled portion of the brine conduit at the top of the counter, which prevents condensation from dripping upon the food stored within the counter.

It will be seen that with the arrangement of the brine circulating conduit and the evaporator, I have provided heat absorbing means both at the top and bottom of the counter, which gives a high efficiency maintaining a low temperature within a chamber having a design similar to a meat counter. It will further be seen that the two cooling elements are arranged and placed so that they occupy a small amount of space within the chamber and without interfering with a customer's view of the contents of the chamber through the front glass wall 13. In addition to the advantages of the arrangement and use of two cooling elements, it will be seen that with the apparatus described, the brine in its flow must pass within the evaporator resulting in an efficient method for absorbing the heat from the brine.

Various changes can be made in the arrangement and construction of the refrigerating apparatus described without departing from the spirit of my invention and the scope of what I claim.

What I claim is:

1. In a refrigerating apparatus the combination with an evaporator associated in circuit with refrigerant compressing and condensing means, of a brine circulating system comprising a closed container within said evaporator and a circuitous conduit, said container having a removable end through which the open ends of said conduit extend.

2. In a refrigerating apparatus for a chamber having a horizontally extending shelf therein, the combination of an elongated flooded evaporator arranged beneath the shelf in said chamber, said evaporator being associated in circuit with refrigerant compressing and condensing means; and a brine circulating system comprising a conduit coiled at the top of said chamber and extending interiorly of said evaporator.

In testimony whereof I hereunto affix my signature.

RICHARD O. ASHTON.